United States Patent Office 3,382,276
Patented May 7, 1968

3,382,276
MIXTURES OF OXYGENATED
ACYCLIC TERPENES
Günther Otto Schenck, Günther Ohloff, and Erich Klein, Mulheim (Ruhr), Germany, assignors to Studiengesellschaft Kohle m.b.H., Mulheim (Ruhr), Germany, a corporation of Germany
No Drawing. Continuation-in-part of application Ser. No. 182,924, Mar. 27, 1962. This application Jan. 14, 1966, Ser. No. 520,642
Claims priority, application Germany, Apr. 7, 1961, St 17,665
8 Claims. (Cl. 260—489)

This application is a continuation-in-part of application Ser. No. 182,924, filed Mar. 27, 1962, now abandoned.

This invention is concerned with a process for the production of oxidation products, in particular from unsaturated compounds.

The photosensitized oxidation of certain hydrocarbon compounds, which contain a double bond, using molecular oxygen as oxidizing agent, is known. For example, according to the information given in German Patent 933,925, α-pinene may be oxidized in the presence of sensitizing substances to form pinocarveyl hydroperoxide.

The direct reaction of oxygen-containing acyclic terpenes of the β-citrolellol type related compounds in the presence of light is also known. This reaction leads in most cases, with a partial alteration of the functional group, to a large number of reaction products or in part to a non-specific degradation and thus to the destruction of the carbon skeleton. Thus, among the oxidation products of citronellol, citronellic oxide and dihydroxy citronellol have been identified in addition to acid fractions, $CO_2$, CO and $H_2$ (R. Dupont, Ind. chim. belge 11, 3 (1940); C.A. 34, 2353 (1940), while its aldehyde, citronellal, changes into menthone, isopulegol, ketone $C_{10}H_{18}$ and dihydroxycitronellic acid and in addition decomposes into molecular fragments that is β-methylhexylic acid, β-methyladipic acid, acetic acid and acetone (Sernagiotto, Atto R. Accad. dei Lincei, Rome (5) 24 (1915), 850.)

By comparison with the first mentioned pure hydrocarbon compounds already proposed for photosensitized oxidation, the compounds of the citronellol type are characterized by the fact that they contain other oxidation-sensitive groups, for example primary or secondary alcoholic groups, in addition to at least one double bond. One cannot predict in what manner these acyclic terpenes will behave on photosensitized oxidation or quite generally what should be the behaviour of compounds which contain such oxygen-containing functional groups as well as a double bond. However, it was to be expected in every case that an attempt at such an oxidation would result in not only the double bond being attacked but also the oxidation-sensitive functional group. The marked susceptibility to oxidation of for example an alcohol or aldehyde group is of course known.

It has, however, surprisingly been found that photosensitized oxidation with molecular oxygen, known per se, for example from German Patent 933,925, can be specifically applied to the oxidation of those ethylenically unsaturated systems with allyl-hydrogen atoms the allyl-oxidizable double bonds being advantageously not in a terminal position, one perhydroxyl group being introduced with simultaneous allyl transposition by displacement of the double bond towards the former allyl position, without the simultaneous production of oxidation reactions which would otherwise be expected to be formed by reaction with functional groups which are generally readily oxidizable.

The subject of the invention is a process for the photosensitized oxidation of ethylenically unsaturated compounds with molecular oxygen and with initial introduction of perhydroxyl groups onto one carbon atom of the double bond and simultaneous displacement of the double bond towards the allyl position and, if desired, subsequent reduction of these oxidation products of the first stage, and is characterized in that with selective oxidation on the C—C multiple bond, there are subjected to the process those unsaturated compounds which contain oxygen-containing groups as well as at least one C—C double bond the oxidation products so formed being if required reduced in a manner known per se.

Particularly suitable starting materials for the process of the invention are those which contain oxidation-sensitive oxygen-containing functional groups and are at least ethylenically unsaturated in one position. Examples of such starting materials are unsaturated alcohols, aldehydes, ketones, carboxylic acids and their derivatives such as esters or the like. As starting material acyclic terpenes such as

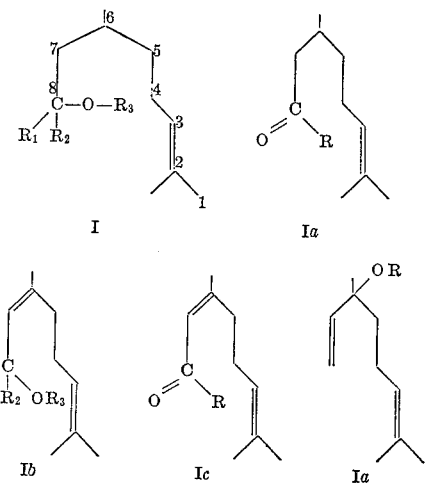

wherein R is a member selected from the group consisting of hydrogen, acyl, straight and branched chain saturated and unsaturated aliphatic hydrocarbons, hydroxy, and alkoxy, $R_1$ and $R_2$ are each a member selected from the group consisting of hydrogen, straight and branched chain saturated and unsaturated aliphatic hydrocarbons, and $R_3$ is a member selected from the group consisting of hydrogen and acyl.

By the process according to the invention, that is with oxidation at the double bond and simultaneous displacement of the double bond into the allyl position, an additional oxygen-containing functional group is introduced into the carbon structure without requiring changes by oxidation in the oxygen-containing groups which are already present. The fact that this process produces results which were to a high degree unexpected is immediately apparent if the known sensitivity to oxidation of the aldehyde group is considered. The specific effect of the oxidation process according to the invention is emphasized by the fact that an undesired oxidation at the oxygen-containing functional group can be avoided even in the presence of this group which is extremely sensitive to oxygen.

The oxidation process can be carried out in a manner known per se. The presence of photosensitizers which transfer oxygen is essential. Such photosensitizers are substances which absorb photochemically acting quanta without undergoing a permanent chemical change. Suitable photosensitizers include classes of substances which are able to photosensitize the ascaridol synthesis from the α-terpinene (G. A. Schenck and K. Ziegler, Naturwissenschaften 32, 1957 (1944)) or to transfer oxygen to tetramethyl ethylene. The sensitizing additives are usually dyestuffs such as Bengal pink, Sudan-G, methylene blue, chlorophyll, Eosin, zinc tetraphenylporphine, dinaphthylene-thiophene, thionine or highly annellated (large number of rings) aromatic hydrocarbons which absorb light filtered through glass, more especially in the range of about 350 to 590 m$\mu$.

The photosensitized oxidation is carried out according to the invention in the presence of gaseous oxygen or gases containing the latter, for example air, and simultaneously the reaction mixture is exposed to a source of artificial or natural radiation which can emit light, more especially in the range from about 350 to 590 m$\mu$. The reaction according to the invention is in particular carried out in the presence of light which has been transmitted through an ordinary glass filter in order to eliminate undesired short-wave ultra-violet components of the light.

The oxidation process can with advantage be carried out in solvents. Suitable solvents are for example alcohols, preferably lower alcohols, in particular methanol, ethanol or propanol. The use of solvents may however be disposed of in certain cases. The compound to be oxidized is then reacted together with the oxygen-containing gas in the presence of small quantities of sensitizer in a reaction apparatus in which the required light of an artificial or natural lighting source is used to best possible effect. With artificial lighting sources, it is generally most desirable to arrange the light source inside the reaction apparatus in such a way that all the available light beam is irradiated into the reaction material. In this way, the unsaturated compounds add exactly 1 molecule of oxygen for each ethylenic double bond with practically quantitative formation of hydroperoxides, and with complete protection of the functional group which simultaneously is present. The formation of hydroperoxide proceeds in such a way that 1 molecule of oxygen is added to one of the two carbon atoms of the double bond. Simultaneously, the double bond is shifted into the C—C single bond adjacent the other carbon atom of the double bond, so that the double bond, after the formation of hydroperoxide, is in the allyl position to the introduced oxygen. In principle, the entry of molecular oxygen with formation of hydroperoxide can take place on one or the other carbon atom of the double bond to be oxidized.

It has been found that with compounds such as can be employed in accordance with the invention, i.e., starting materials and namely acyclic terpenes containing both at least one double bond and an oxygen-containing functional group particular features result if such an oxygen-containing group is present on a C—C double bond. For example, if compounds are used in the process according to the invention with which a carbon atom adjacent the double bond is simultaneously combined with an oxygen atom, that is to say, if the double bond is for example present in the allyl position to the oxygen-containing group, then this double bond will normally not be affected by the photosensitized oxidation. The oxygen-containing group can therefore exert a protective action on the double bonds immediately juxtaposed thereto. This fact can be utilized with advantage in the process according to the invention, in that compounds unsaturated in more than one position, with which there is at least one double bond which is largely insensitive to the action of oxygen under reaction conditions, are selectively oxidized in at least one additional double bond situated at another position without simultaneous oxidation of the first-mentioned double bonds.

The hydroperoxides formed according to the invention as first-stage reaction products can thereafter be subjected to a reduction in accordance with a further feature of the invention. Thus, it is possible for the hydroperoxide groups to be reduced in a manner known per se to the corresponding alcoholic groups. This reduction can for example be effected with sodium sulphite e.g., by treatment with a saturated aqueous sodium sulphite solution, by treatment with triphenyl phosphine in the cold or by treatment with other reducing agents known per se, for example, complex alkali aluminum hydrides such as LiAlH$_4$. If the oxygen-containing functional group which is originally present exists in a higher oxidation stage, then in accordance with a further embodiment of the invention, this other oxygen-containing group can also be simultaneously or subsequently reduced. It is possible in this way to prepare, from unsaturated oxygen-containing compounds, polyfunctional alcohols which contain one OH-group more per oxidized double bond, by comparison with the functional oxygen-containing groups of the starting product. The process according to the invention is more especially suitable for the production of glycols from simple unsaturated monofunctional oxygen-containing compounds, the fact that they still contain the original double bond even though it is displaced by one position in the carbon chain being characteristic of these glycols. The process of the invention discloses the possibility of obtaining, by synthesis, compounds which otherwise are comparatively difficult to obtain, which compounds are of industrial and economic interest in many respects.

The process of the invention is more especially suitable for the photosensitized oxidation of compounds from the class comprising acyclic terpenes, such as can for example be obtained from turpentine oil. Typical representatives of compounds from the class of acyclic terpenes which can be oxidized according to the invention are compounds such as are characterized by the Formulae I, Ia, Ib, Ic, and Id set out below. In these general formulae the radicals $R_1$ and $R_2$ represent in particular hydrogen or saturated or even unsaturated alkyl radicals. The radicals $R_1$ and $R_2$ can be the same or different radicals. If alkyl radicals are present, then these are preferably lower alkyl raidicals, advantageously those containing up to 6 carbon atoms. Typical representatives of such acyclic terpenes which can be subjected to the process according to the invention are the following:

General Formula I:

β-citronellol: $R_1$—$R_3$=H
β-citronellyl acetate: $R_1$+$R_2$=H
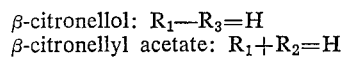

2,6-dimethyl-2-nonene-8-ol: $R_1$=—$CH_3$; $R_2$+$R_3$=H
2,6,8 - trimethyl - 2 - nonene-8-ol: $R_1$+$R_2$=—$CH_3$; $R_3$=H
2,6 - dimethyl-2,9-decadiene-8-ol: $R_1$=—CH=$CH_2$; $R_2$+$R_3$=H
2,6,11-trimethyl-2,11-duodecadiene-8-ol:

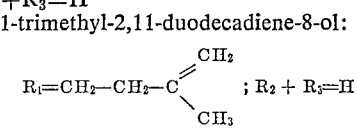

General Formula Ia:

β-citronellal: R=H
2,6-dimethyl-2-nonene-8-al: R=—$CH_3$
2,6-dimethyl-2,9-decadiene-8-al: R=—CH=$CH_2$ General Formula Ib:

Nerol=cis-2,6-dimethyl-2,6-octadiene-8-ol:

$R_1$—$R_3$=H

Geraniol=trans-2,6-dimethyl - 2,6 - octadiene-8-ol: $R_1$—$R_3$=H
Geranyl acetate: $R_1$+$R_2$=H;

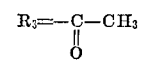

2,6,8-trimethyl-2,6-nonadiene-8-ol:

$R_1$+$R_2$=—$CH_3$ $R_3$=H

General Formula Ic:

β-citral (Neral or Geranial): R=H

General Formula Id:

β-Linalool: R=H
β-Linalyl acetate:

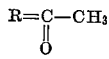

The products formed in each case as a result of the oxidation reaction according to the invention which have a hydroperoxide group (II to IId and III to IIId) are shown in the reaction scheme set out below. It has surprisingly been found that in all cases investigated, the introduction of oxygen into the double bond to be oxidized occurs in such a way that 60% of the reaction products represent compounds from the class of the general Formulae II and the remaining 40% from the class of the Formulae III.

As already mentioned, it is also extremely surprising that the selectivity of the oxygen attack on the $C_2$ and $C_3$ of the general formulae is fully maintained as soon as a second double bond is introduced into the molecule, and in fact in the vinyl or allyl position ($C_6$, $C_7$) to the oxygen function. Thus, the compounds of the general Formulae Ib, Ic, and Id could be transformed just as simply as I and Ia into the mixture of their hydroperoxide derivatives IIb to IId and IIIb to IIId.

Hydroperoxide derivatives of the general Formulae II, IIb, IId or III, IIIb, and IIId in which $R_3$ (or R in IId and IIId) represents a hydrogen, can be transformed by reaction of the hydroperoxide group with a saturated aqueous sodium sulphite solution in a manner known per se into glycols of the general Formulae IV, IVb, and IVd and simultaneously V, Vb, and Vd. If the functional group in the 8-position is or contains a higher oxidation stage than a hydroxyl group, the reduction can also be carried out in stages, by treating the hydroperoxide group in the 2- or 3-position with triphenyl phosphine in the cold. For more detailed illustration reference is to be made to compounds of the type II or IIb, and III or IIIb, respectively, in which $R_3$ or, as in the case of IId or IIId, R represents an acetyl group, while $R_1$ and $R_2$ contain H or alkyl groups. In another case, the partial reduction of the hydroperoxide group can also be carried out on compounds of the general Formulae IIa or IIc, in which R represents hydrogen, alkyl groups, a hydroxyl group or alkoxy groups. It is also possible at will for hydroperoxide derivatives, the functional group of which in the 8-position has a higher oxidation stage than a hydroxyl group, to be transformed in one step into the glycols IV to IVd or V to Vd, if the reaction products of the photoxidation are reduced directly, if desired with the aid of $LiAlH_4$.

Starting from optically active starting material of the general Formulae I, Ia and Id there are obtained according to the invention, at will, photoxidation products or partial reduction products or glycols having the same or opposite optical rotation. The degree of the activity is merely dependent on the rotational value of the starting material.

The partial reduction products of the photoxidation of the glycols can be separated from one another in a manner known per se by physical or chemical methods.

All glycols of the acyclic terpene series which are prepared by the process of the invention and more especially described herein are new and can be used as valuable perfuming substances on account of their pleasing odor and their high fixing effect. Furthermore, the derivatives hydroxylated in the 2- or 3-position and having a functional group different from the hydroxyl group in the 8-position, such as those obtained with the partial reduction of the photoxidation of compounds of Formulae I to Id constitute valuable perfumes and also are unknown.

The formulae and reaction schemes referred to above are set out below (see pages 17-21).

In order that the invention may be further understood, the following examples are given by way of illustration only:

EXAMPLE 1

A solution of 1000 g. of citronellol in 800 cc. of methanol is exposed to light under oxygen in the presence of 4 g. of Bengal pink at room temperature in a lighting apparatus with an oxygen circulation and dipping lamp arrangement (HGH 5000, 900 watt). Oxygen absorption is practically complete after 160 liters have been absorbed in 18 hours. The quantity corresponds to an oxygen absorption of 100% of the theoretical.

The strongly peroxidic reaction solution is poured into an ice-cooled saturated aqueous solution of 2000 g. of sodium sulphite (20% excess of the theoretical) with vigorous stirring. After stirring for 1 hour in an ice-cold condition, the reaction solution is heated for another hour to 70° C. The organic layer is then separated from the aqueous phase and the reaction mixture is subjected to a vacuum distillation. In this way, a glycol mixture is obtained, having the following physical constants:

$B.P._{0.01}$ 99–101° C.; $N_D^{20}$ 1.4719; $d_4^{20}$ 0.9431; $\alpha_D^{20}$ —133°.

Yield: 1080 g. of glycol mixture=98% of the theoretical.

EXAMPLE 2

A solution of 196 g. of (+)-citronellyl acetate in 780 cc. of methanol takes up 30.5 liters of oxygen over 6 hours in the presence of 1 g. of Bengal pink in the experimental apparatus as described in Example 1. The reaction product is distilled off from the solvent and it is conducted slowly into a solution of 262 g. of triphenyl phosphine in 400 cc. of dioxane with ice-cooling and vigorous stirring. By decanting off or filtering with suction, the triphenyl phosphine oxide which has formed is separated from the remaining reaction mixture, and the latter is further purified by removal of the solvent and vacuum distillation. The acetoxy-glycol mixture had the following physical constants:

$n_D^{20}$ 1.4580; $d_4^{20}$ 0.9669; $\alpha_D^{20}$+1.45.

Yield: 185 g.=88% of the theoretical.

50 g. of monoacetoxy-glycol are heated in 250 cc. of a half-normal alcoholic caustic potash solution for 1 hour under reflux. The saponification mixture is then poured into water and the organic layer is distilled in vacuo. The glycol mixture which is formed has the following physical constants:

$n_D^{20}$ 1.4725; $d_4^{20}$ 0.943; $\alpha_D^{20}$+1.38.

Yield: 37 g.=95% of the theoretical.

EXAMPLE 3

308 g. of citronellal in 650 ml. of methanol are exposed to light under oxygen in the presence of 1 g. of Bengal pink in the experimental arrangement according to Example 1. After 10 hours, the oxygen absorption was practically completed at 42.25 liters. The working up of the oxidation mixture was effected with sodium sulphite as described in Example 1. A hydroxy-citronellal mixture is obtained which boils at 83 and 90° C./0.02–0.05 mm. Hg. Yield: 292 g.=90% of the theoretical.

50 g. of the crude photoxidation product freed from the solvent is introduced dropwise and with vigorous stirring into an ice-cooled suspension of 12 g. of $LiAlH_4$ in 500 cc. of absolute ether. The reaction mixture is worked up in the usual way after stirring for 1 hour at room temperature. In this way, a glycol mixture is obtained which has the same composition as that obtained according to Example 1. Yield: 49.5 g.=98% of the theoretical.

EXAMPLE 4

120 g. of citronellic acid in 870 cc. of methanol are photoxidized under the same conditions as indicated in Example 1. Oxygen absorption after 6 hours: 17.85 liters=100% of the theoretical.

The reduction of the hydroperoxy acid was effected as indicated in Example 2.

Yield of oxyacid mixture: 122 g.=93% of the theoretical.

50 g. of the crude photoxidation mixture freed from the solvents is introduced dropwise into a suspension of 15 g. of $LiAlH_4$ in 300 cc. of ether with vigorous stirring and cooling with ice and worked up in accordance with Example 3.

Yield of glycol mixture of the same composition as indicated in Example 1: 36 g.=89% of the theoretical.

EXAMPLE 5

308 g. of geraniol in 650 cc. of methanol are photoxidized in the presence of 1 g. of Bengal pink in the experimental arrangement corresponding to Example 1. Oxygen absorption after 9 hours 40 minutes is 46.75 liters=100% of the theoretical. After working up the hydroxy hydroperoxide mixture with sodium sulphite solution in accordance with the data given in Example 1, a glycol mixture is obtained which has the following physical constants:

B.P.$_{0.06}$ 105°; $n_D^{20}$ 1.4921; $d_4^{20}$ 0.9768.
Yield: 278 g.=95% of the theoretical.

EXAMPLE 6

Under the conditions of Example 5 and over a period of 10 hours, 300 g. of nerol took up 45.05 liters of oxygen. After reduction of the hydroxy hydroperoxide mixture with sodium sulphite solution, a glycol mixture is obtained, having the following physical constants:

B.P.$_{0.05}$ 100–107° C.; $n_D^{20}$ 1.4907; $d_4^{20}$ 0.9718.
Yield: 267 g.=93% of the theoretical.

EXAMPLE 7

308 g. of (−)-Linaloöl is photoxidized in exactly the same way as indicated in Example 1. An oxygen absorption of 45.85 liters is obtained within 10 hours 40 minutes, this corresponding to a quantitative oxygen absorption for a double bond.

The hydroxyhydroperoxide mixture is worked up in the usual manner by reduction with sodium sulphite. The physical constants of the glycol mixture are:

B.P.$_{0.05}$ 68–72° C.; $n_D^{20}$ 1.4788; $d_4^{20}$ 0.9578; $\alpha_D^{20}$ −2.5.
Yield: 316 g.=93% of the theoretical.

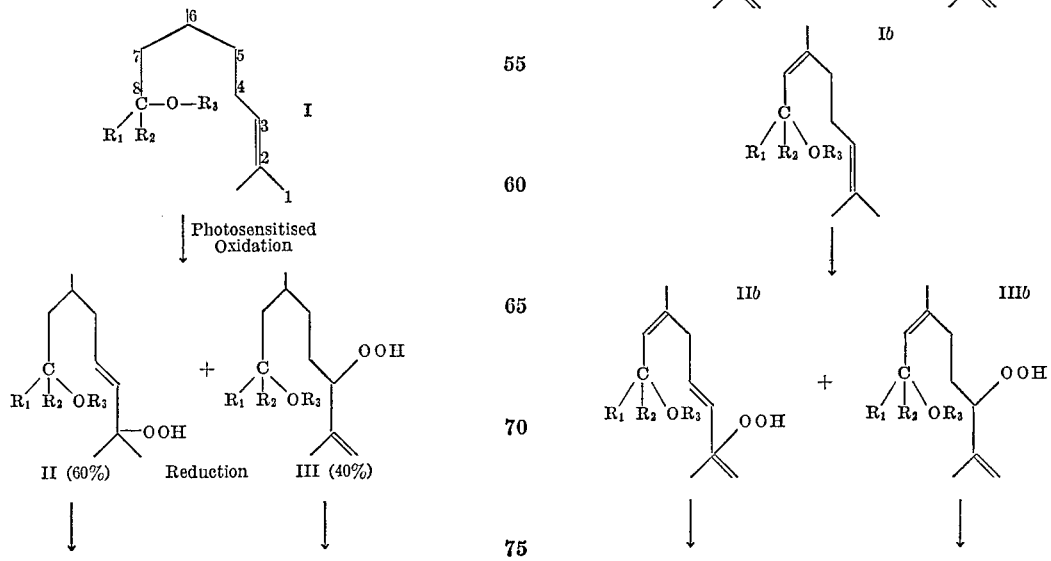

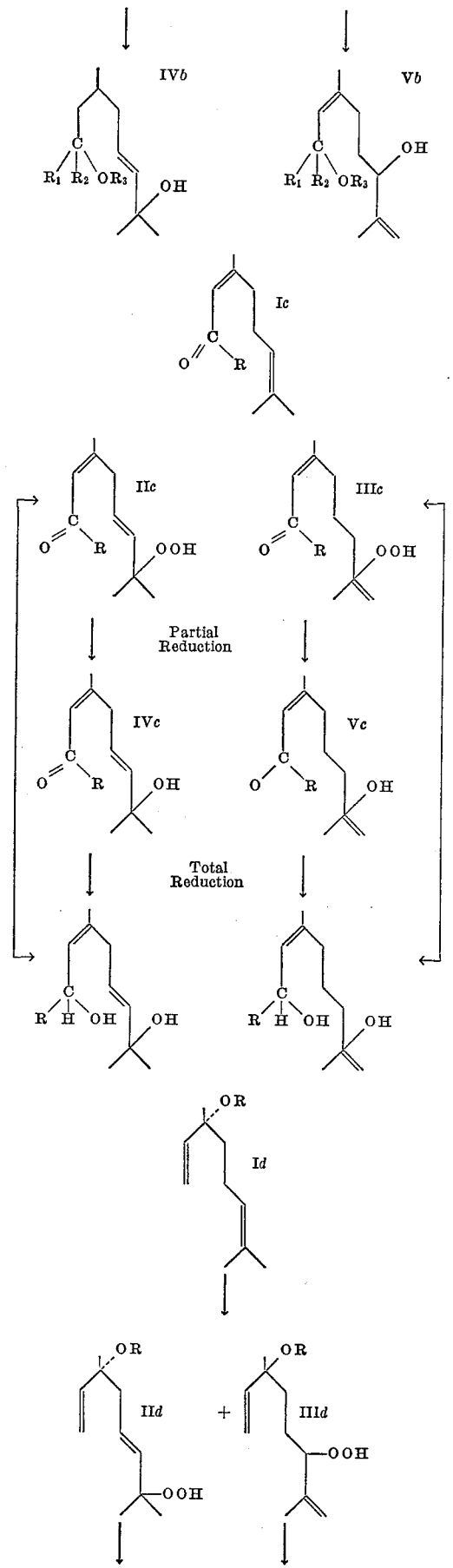
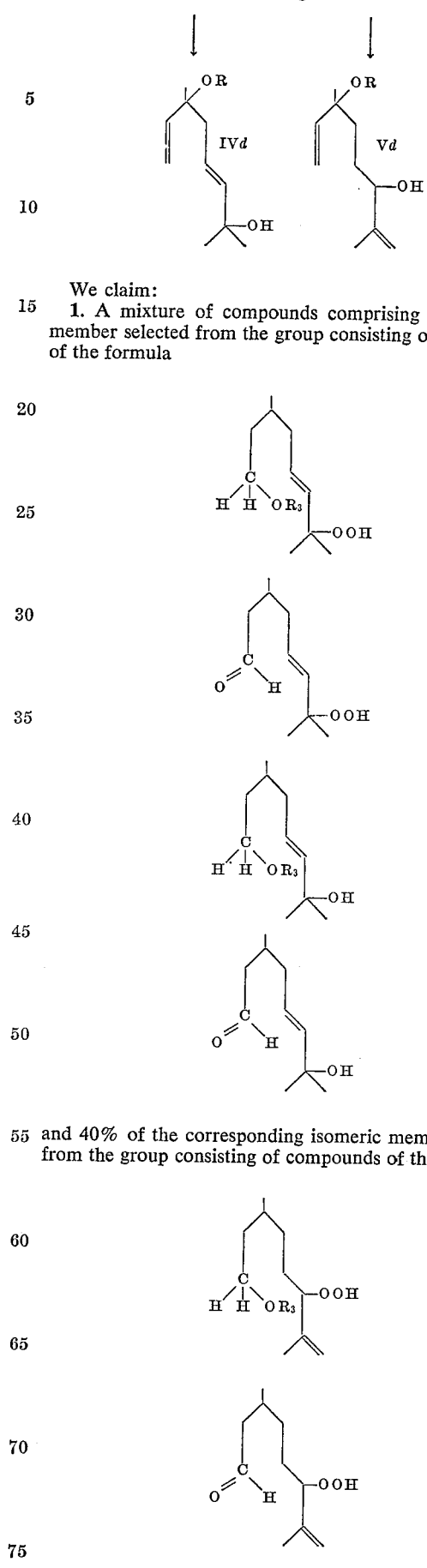
We claim:
1. A mixture of compounds comprising 60% of one member selected from the group consisting of compounds of the formula
and 40% of the corresponding isomeric member selected from the group consisting of compounds of the formula

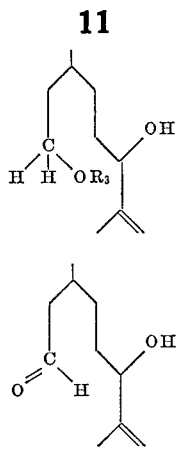

wherein $R_3$ is a member selected from the group consisting of hydrogen and acetyl.

2. A glycol mixture prepared by contacting citronellol with an oxygen-containing gas in the presence of Bengal pink as photo-sensitive catalyst, subjecting the mixture to irradiation by light having a wave length within the range of 350 to 590 m$\mu$ and subjecting the photo-sensitized oxidation product thereby obtained to reduction with sodium sulfite characterized by a boiling point of B.P.$_{0.01}$ 99–101° C.; $n_D^{20}$ 1.4719; $d_4^{20}$ 0.9431; $\alpha_D^{20}$ —1.33°.

3. An acetoxy glycol mixture prepared by contacting (+)-citronellyl acetate with an oxygen-containing gas in the presence of Bengal pink as photo-sensitive catalyst, subjecting the mixture to irradiation by light having a wave length within the range of 350 to 590 m$\mu$, and subjecting the photo-sensitized oxidation product thereby obtained to reduction with triphenyl phosphine oxide, characterized by the following physical properties: $n_D^{20}$ 1.4580; $d_4^{20}$ 0.9669; $\alpha_D^{20}$+1.45°.

4. An acetoxy glycol mixture prepared by contacting (+)-citronellyl acetate with an oxygen-containing gas in the presence of Bengal pink as photo-sensitive catalyst, subjecting the mixture to irradiation by light having a wave length within the range of 350 to 590 m$\mu$, and subjecting the photo-sensitized oxidation product thereby obtained to reduction with triphenyl phosphine oxide, and saponifying the reduction product thereby produced with caustic potash solution, characterized by the following physical properties: $n_D^{20}$ 1.4725; $d_4^{20}$ 0.943; $\alpha_D^{20}$+1.38°.

5. A hydroxy citronellal mixture prepared by contacting citronellal with an oxygen-containing gas in the presence of Bengal pink, subjecting the mixture to irradiation by light having a wave length within the range of 350 to 590 m$\mu$, and subjecting the photo-sensitized oxidation product thereby obtained to reduction with sodium sulfite, characterized by the following boiling point: 83 to 90° C./0.02–0.05 mm. Hg.

6. A glycol mixture prepared by contacting geraniol with an oxygen-containing gas in the presence of Bengal pink, subjecting the mixture to irradiation by light having a wave length within the range of 350 to 590 m$\mu$, and subjecting the photo-sensitized oxidation product thereby obtained to reduction with sodium sulfite, characterized by the following physical properties: B.P.$_{0.06}$ 105° C.; $n_D^{20}$ 1.4921; $d_4^{20}$ 0.9768°.

7. A glycol mixture prepared by contacting nerol with an oxygen-containing gas in the presence of Bengal pink as photo-sensitive catalyst, subjecting the mixture to irradiation by light having a wave length within the range of 350 to 590 m$\mu$, and subjecting the photo-sensitized oxidation product thereby obtained to reduction with sodium sulfite, characterized by the following physical properties: B.P. $_{0.05}$ 100–107° C.; $n_D^{20}$ 1.4907; $d_4^{20}$ 0.9718°.

8. A glycol mixture prepared by contacting (—)-linalool with an oxygen-containing gas in the presence of Bengal pink as photo-sensitive catalyst, subjecting the mixture to irradiation by light having a wave length within the range of 350 to 590 m$\mu$, and subjecting the photo-sensitized oxidation product thereby obtained to reduction with sodium sulfite, characterized by the following physical properties: B.P. $_{0.05}$ 68–72° C.; $n_D^{20}$ 1.4788; $d_4^{20}$ 0.9578; $\alpha_D^{20}$—2.5°.

References Cited
UNITED STATES PATENTS 3,014,047   12/1961   Bain et al. _____ 260—489

OTHER REFERENCES

Kenney et al.: J. Am. Chem. Soc., vol. 81, pages 4288–4291 (1959).

LORRAINE A. WEINBERGER, *Primary Examiner.*

V. GARNER, *Assistant Examiner.*

UNITED STATES PATENT OFFICE
CERTIFICATE OF CORRECTION

Patent No. 3,382,276　　　　　　　　　　　　　　　May 7, 1968

Günther Otto Schenck et al.

It is certified that error appears in the above identified patent and that said Letters Patent are hereby corrected as shown below:

Column 1, line 27, "citrolellol" should read -- citronellol --; line 37, before "ketone" insert -- a --; line 38, "$C_{10}H_{18}$" should read -- $C_{10}H_{18}O$ --; line 51, "should" should read -- would --. Column 3, line 2, "G. A. Schenck" should read -- G. O. Schenck --. Column 6, line 26, "133°" should read -- 1.33° --; line 66, "83 and 90°" should read -- 83 to 90° --. Column 7, line 50, "2.5" should read -- 2.5° --. Column 8, lines 35 to 42, formula Va should appear as shown below:

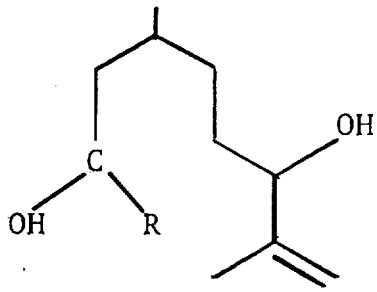

same column 8, lines 45 to 52, in the right-hand column, the formula should appear as shown below:

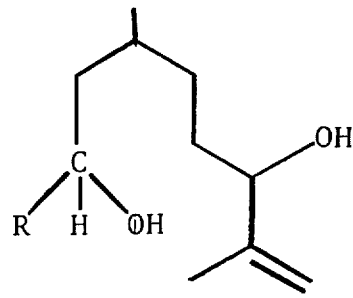

Column 9, lines 22 to 29, formula IIIc, should appear as shown below:

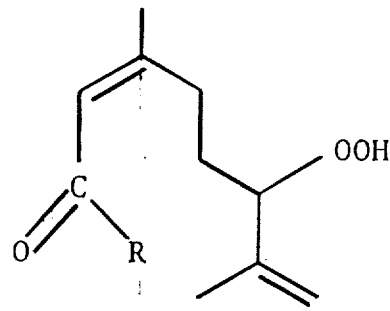

same column 9, lines 33 to 40, formula Vc should appear as shown below:

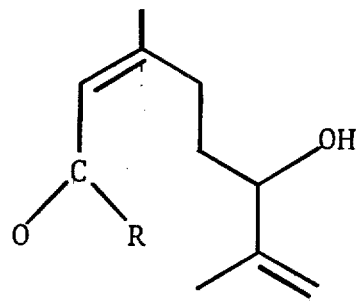

same column 9, lines 43 to 51, in the right-hand column, the formula should appear as shown below:

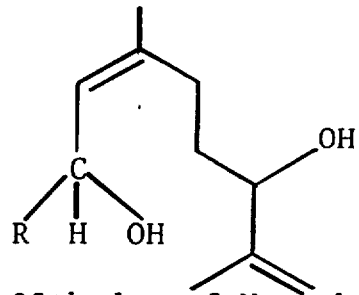

Signed and sealed this 25th day of November 1969.

(SEAL)
Attest:

EDWARD M. FLETCHER, JR.
Attesting Officer

WILLIAM E. SCHUYLER, JR.
Commissioner of Patents